(12) United States Patent
Wong et al.

(10) Patent No.: US 12,156,172 B2
(45) Date of Patent: *Nov. 26, 2024

(54) EFFICIENTLY HANDLING COMMUNICATIONS IN WIRELESS TELECOMMUNICATIONS SYSTEMS

(71) Applicant: Sony Group Corporation, Tokyo (JP)

(72) Inventors: Shin Horng Wong, Basingstoke (GB); Martin Warwick Beale, Basingstoke (GB); Vivek Sharma, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,769

(22) Filed: May 23, 2023

(65) Prior Publication Data

US 2023/0292283 A1    Sep. 14, 2023

Related U.S. Application Data

(63) Continuation of application No. 17/734,121, filed on May 2, 2022, now Pat. No. 11,696,253, which is a
(Continued)

(30) Foreign Application Priority Data

Aug. 9, 2018   (EP) .................................... 18188364

(51) Int. Cl.
*H04W 68/00*   (2009.01)
*H04W 76/27*   (2018.01)

(52) U.S. Cl.
CPC ........... *H04W 68/00* (2013.01); *H04W 76/27* (2018.02)

(58) Field of Classification Search
CPC .............................. H04W 68/00; H04W 76/27
(Continued)

(56) References Cited

U.S. PATENT DOCUMENTS 11,343,791 B2    5/2022  Wong et al.
2004/0180675 A1*  9/2004  Choi ..................... H04W 72/30
                                                          455/458
(Continued)

FOREIGN PATENT DOCUMENTS

WO    2018/010769 A1   1/2018
WO    2018/029001 A1   2/2018
WO    2018/114258 A1   6/2018

OTHER PUBLICATIONS

International Search Report and Written Opinion mailed on Oct. 31, 2019, received for PCT Application PCT/EP2019/071248, Filed on Aug. 7, 2019, 9 pages.
(Continued)

*Primary Examiner* — Ted M Wang
(74) *Attorney, Agent, or Firm* — XSENSUS LLP

(57) ABSTRACT

A method of operating a terminal device to receive user plane data from a network infrastructure equipment in a wireless telecommunications network when the terminal device is not in an active radio resource connected mode, the method comprising: receiving paging message signalling from the network infrastructure equipment, wherein the paging message signalling comprises an indication the network infrastructure equipment has user plane data for transmission to the terminal device while the terminal device is not in an active radio resource connected mode; determining from the paging message signalling a set of radio resources on which the user plane data is to be transmitted by the network infrastructure equipment to the terminal device; and receiving the user plane data from the network infrastructure
(Continued)

equipment using the determined set of radio resources while the terminal device is not in an active radio resource connected mode.

18 Claims, 8 Drawing Sheets

Related U.S. Application Data continuation of application No. 17/264,849, filed as application No. PCT/EP2019/071248 on Aug. 7, 2019, now Pat. No. 11,343,791.

(58) Field of Classification Search
USPC .......................................................... 455/458
See application file for complete search history.

(56) References Cited

U.S. PATENT DOCUMENTS

| | | |
|---|---|---|
| 2012/0093052 A1 | 4/2012 | Kang et al. |
| 2016/0219495 A1 | 7/2016 | Martin et al. |
| 2018/0084560 A1 | 3/2018 | Cho et al. |
| 2018/0132284 A1 | 5/2018 | Oh |
| 2018/0234944 A1 | 8/2018 | Reial et al. |
| 2019/0239183 A1 | 8/2019 | Du et al. |
| 2020/0022095 A1* | 1/2020 | Kim ............... H04W 48/18 |
| 2020/0322868 A1 | 10/2020 | Claffey et al. |
| 2020/0406860 A1 | 12/2020 | Mai et al. |

OTHER PUBLICATIONS

3GPP, "Evolved Universal Terrestrial Radio Access (E-UTRA) and Evolved Universal Terrestrial Radio Access Network (E-UTRAN)", Stage 2, (Release 15), TS 36.300 V15.2.0, Jun. 2018, pp. 1-357.

Ericsson, "Revised WID for Further Enhanced MTG for LTE", , RP-161464, 3GPP TSG RAN Meeting #73, Sep. 19-22, 2016, 6 pages.

Huawei et al., "Revised Work Item Proposal: Enhancements of NB-IoT", RP-161901, 3GPP TSG RAN Meeting #73, Sep. 19-22, 2016, 8 pages.

Ericsson et al., "New WID on Even Further Enhanced MTG for LTE", RP-170732, 3GPP TSG RAN Meeting #75, Mar. 6-9, 2017, 4 pages.

Huawei et al., "New WID on Further NB-IoT Enhancements", RP-170852, 3GPP TSG RAN Meeting #75, Mar. 6-9, 2017, 6 pages.

Ericsson, "New WID on Rel-16 MTG Enhancements for LTE", RP-181450, 3GPP TSG RAN Meeting #80, Jun. 11-14, 2018, 4 pages.

Ericsson et al., "New WID on Rel-16 Enhancements for NB-IoT", RP-181451, 3GPP TSG RAN Meeting #80, Jun. 11-14, 2018, 4 pages.

Holma et al., "LTE for UMTS OFDMA and SC-FDMA Based Radio Access", John Wiley and Sons, 2009, pp. 25-27.

ETSI, "Evolved Universal Terrestrial Radio Access (E-UTRA); Medium Access Control (MAC) Protocol Specification", TS 136 321 V15.2.0, Jul. 2018, pp. 1-127.

Hambeck et al., "A 2.4 µW Wake-up Receiver for Wireless Sensor Nodes with—71dBm Sensitivity", IEEE Proceeding International Symposium of Circuits and Systems (ISCAS), 2011, pp. 534-537.

3GPP, "Evolved Universal Terrestrial Radio Access (E-UTRA); Multiplexing and Channel Coding", Release 15, TS 36.212 V15.2.0, Jun. 2018, pp. 1-245.

3GPP, "Evolved Universal Terrestrial Radio Access (E-UTRA); User Equipment (UE) Procedures in Idle Mode", TS 36.304 V15.0.0, Release 15, Jun. 2018, pp. 1-52.

3GPP, "Technical Specification Group Core Network and Terminals; Numbering, Addressing and Identification", Release 15, TS 23.003 V15.2.0, Dec. 2017, pp. 1-116.

* cited by examiner

EFFICIENTLY HANDLING COMMUNICATIONS IN WIRELESS TELECOMMUNICATIONS SYSTEMS

CROSS-REFERENCE TO RELATED APPLICATIONS

The present application is a continuation of U.S. application Ser. No. 17/734,121, filed May 2, 2022, which is a continuation of U.S. application Ser. No. 17/264,849, filed Feb. 1, 2021 (now U.S. Pat. No. 11,343,791), which is based on PCT filing PCT/EP2019/071248, filed Aug. 7, 2019, which claims priority to EP 18188364.6, filed Aug. 9, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancement for Narrowband Internet of Things) [6].

At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
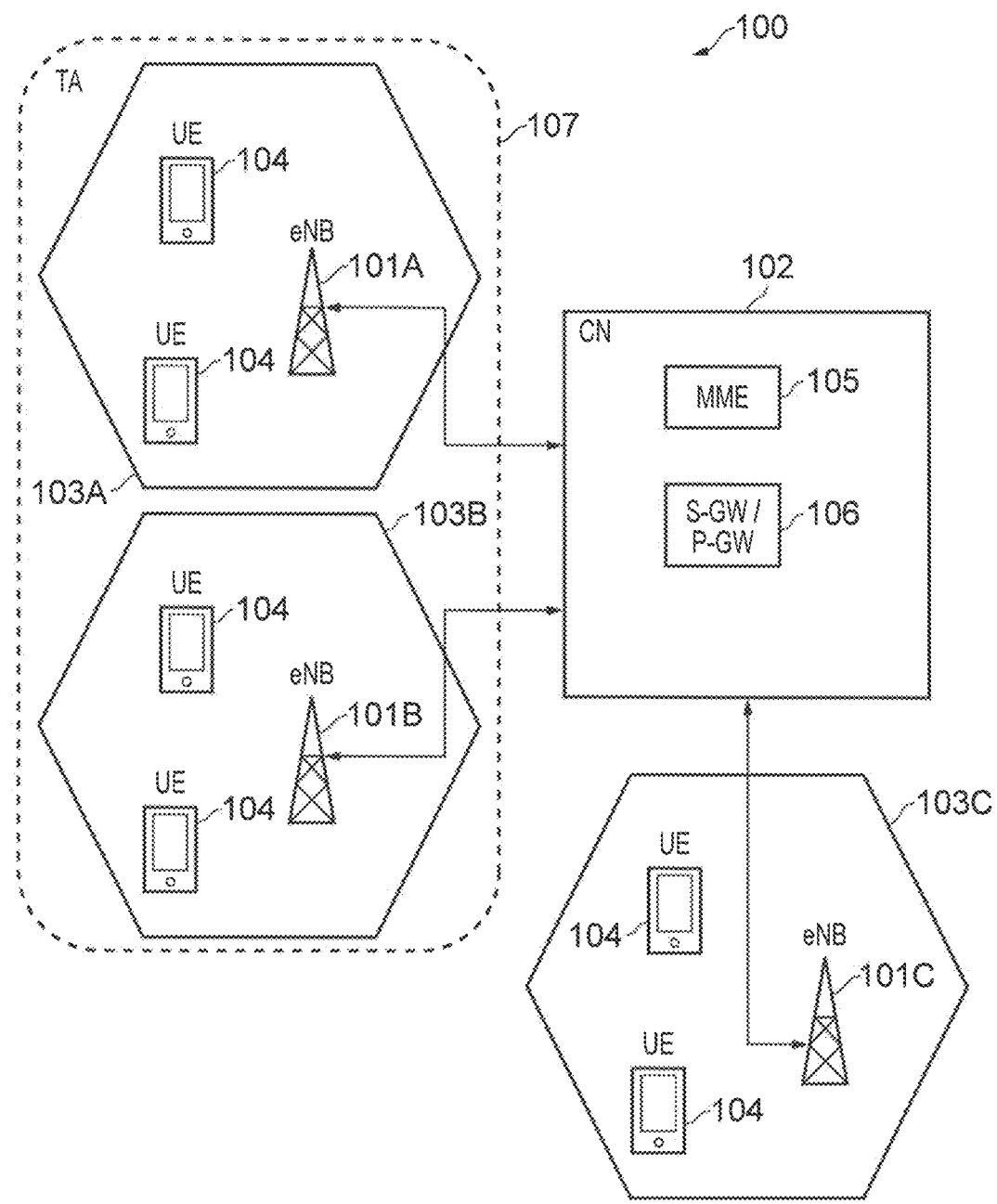
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [7]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network includes a plurality of base stations 101A, B, C connected to a core network 102. Each base station provides a coverage area 103A, B, C (i.e. a communication cell) within which data can be communicated to and from various terminal devices 104. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station. Nonetheless, it will be appreciated in some cases the physical apparatus comprising a base station may comprise equipment for supporting more than one communication cell and in such cases it can still be appropriate to draw a distinction between base stations and cells. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

In terms of basic operation, data are transmitted from base stations 101A, B, C to terminal devices 104 within their respective coverage areas 103 via a radio downlink and from terminal devices 104 to the base stations 101A, B, C via a radio uplink. The core network 102 routes data to and from terminal devices 104 via respective base stations 101A, B, C and provides functions such as authentication, mobility management, charging and so on. To this end, the core network (CN) 102 comprises a mobility management entity (MME) 105 and a serving gateway (S-GW) entity and a packet data network gateway (P-GW) entity. For simplicity the serving gateway entity and packet data network gateway are schematically represented in FIG. 1 as a single combined (S-GW/P-GW) gateway entity 106.

It is known for a group of base stations (with associated cells) to be logically grouped together into a so-called tracking area (TA). In FIG. 1 the communication cells 103A and 103B associated with base stations 101A and 101B are schematically represented as belonging to a tracking area 107. For this particular example it is assumed the communication cell 103C associated with base station 101C belongs to a different tracking area, although this other tracking area is not represented in the figure. The sizes of tracking areas are typically not specified in wireless telecommunications system specifications. However, a typical tracking area in an LTE-based network might be expected to include perhaps twenty base stations/cells, but could be more/fewer according to the implementation at hand. Tracking areas play a role in paging.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit in a cell has a coverage area (radio access footprint) and the aggregation of the coverage areas of the distributed units defines the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to the base stations of FIG. 1. Thus, the term network infrastructure equipment/access node may be used to encompass these elements and more conventional base-station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the radio network infrastructure for the implementation at hand. For example, in some scenarios the network infrastructure equipment/access node may comprise a base station, such as an LTE-type base station 101A, B, C as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network by paging). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive user plane data during the Random Access process whilst in idle mode (or more generally while not in an active radio resource connection mode), thereby communicating the relevant data without the need to complete the establishment of an RRC connection, which can be particularly helpful for infrequent and short messages types of traffic.

Figure 2:
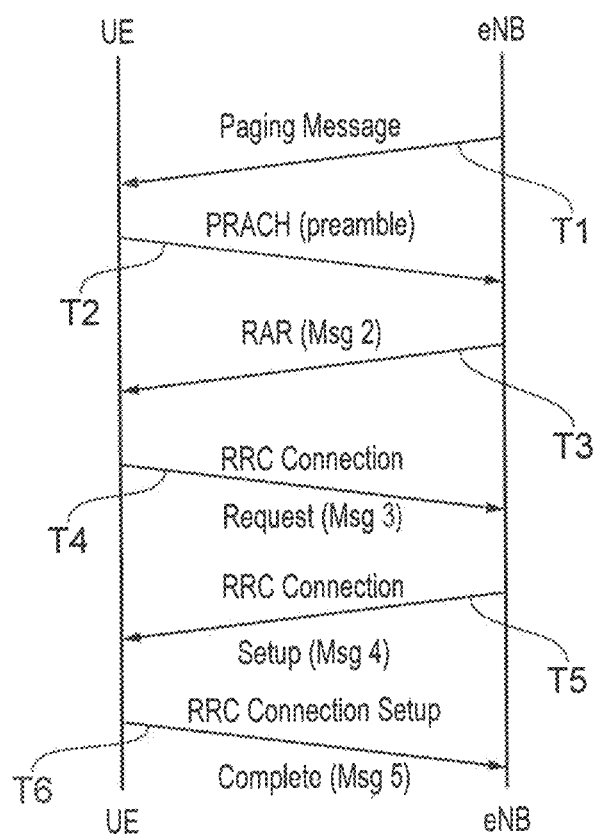
FIG. 2 schematically represents steps in a paging-initiated random access procedure in a wireless telecommunication network.

FIG. 2 is a ladder diagram that schematically shows message exchange between a UE and an eNB in a typical random access procedure to establish an RRC connection, for example in an LTE-based network. It is assumed for this example the random access procedure is network triggered, for example because the network has downlink data for transmission to the terminal device. Thus, the process starts in step T1 with the eNB transmitting a paging message to the UE. The UE responds in step T2 by transmitting a random access request on a physical random access channel (PRACH in an LTE context), i.e. a random access preamble (RACH preamble), to the eNB. In step T3, when the eNB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step T2, and the RAR will indicate which preamble the eNB has detected and is responding to. It may be noted it is possible that multiple UEs may transmit a random access request using the same PRACH preamble and at the same time and frequency resources. The RAR of step T3 also contains an uplink grant for the preamble the network is responding to so that the UE that transmitted the preamble may use this uplink grant to transmit an RRC Connection Request message, also known as Message 3 to the eNB, in step T4. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNB will respond to Message 3, in step T5, with Message 4 which carries an RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step T6 containing a RRC Connection Setup Complete message.

Although FIG. 2 schematically shows a network-initiated random access procedure, the same approach is taken for a UE-initiated random access procedure except the UE does not receive a paging message in step T1, and instead the UE autonomously determines it should transmit the PRACH preamble in step T2.

As noted above, certain implementations of wireless telecommunications systems may include terminal devices, for example IoT/MTC devices, that typically provide relatively infrequent reports and receive relatively infrequent commands from the network, e.g. sensors and utility meters and other such IoT devices. Consequently some UEs may be expected to be in a power saving mode or long DRX (discontinuous reception) for most of the time to conserve battery power. Hence, when there is data to transmit or receive, due to the long DRX, the UE may need to reacquire synchronization, update system information and connect to the network to perform the data exchange. This process can take a relatively long time and consume a relatively large amount of battery power. Recognising this, in Release 15 of the 3GPP standards Early Data Transmission (EDT) was introduced in the uplink. Uplink EDT allows a UE to transmit data to the network during the RRC connection process itself. It is proposed the uplink EDT is transmitted using Message 3 of the RACH procedure, with the UE moving back to idle mode after Message 4. This approach can help avoid the need to establish an RRC connection (i.e. complete a RACH procedure), and can hence help reduce power consumption.

In Release 16 of the 3GPP standards which propose A-MTC (Additional Machine Type Communications Enhancements) and A-NB-IoT (Additional Enhancement for Narrowband Internet of Things), EDT is further developed to include Mobile Terminated (MT) data, i.e. downlink EDT. Similarly to uplink EDT in Release 15, downlink EDT can be used by the network to transmit data to the UE without the need to establish an RRC connection. For MT data, the network initiates the RRC connection process by paging the UE to trigger a Random Access procedure as shown in FIG. 2.

Figure 3:
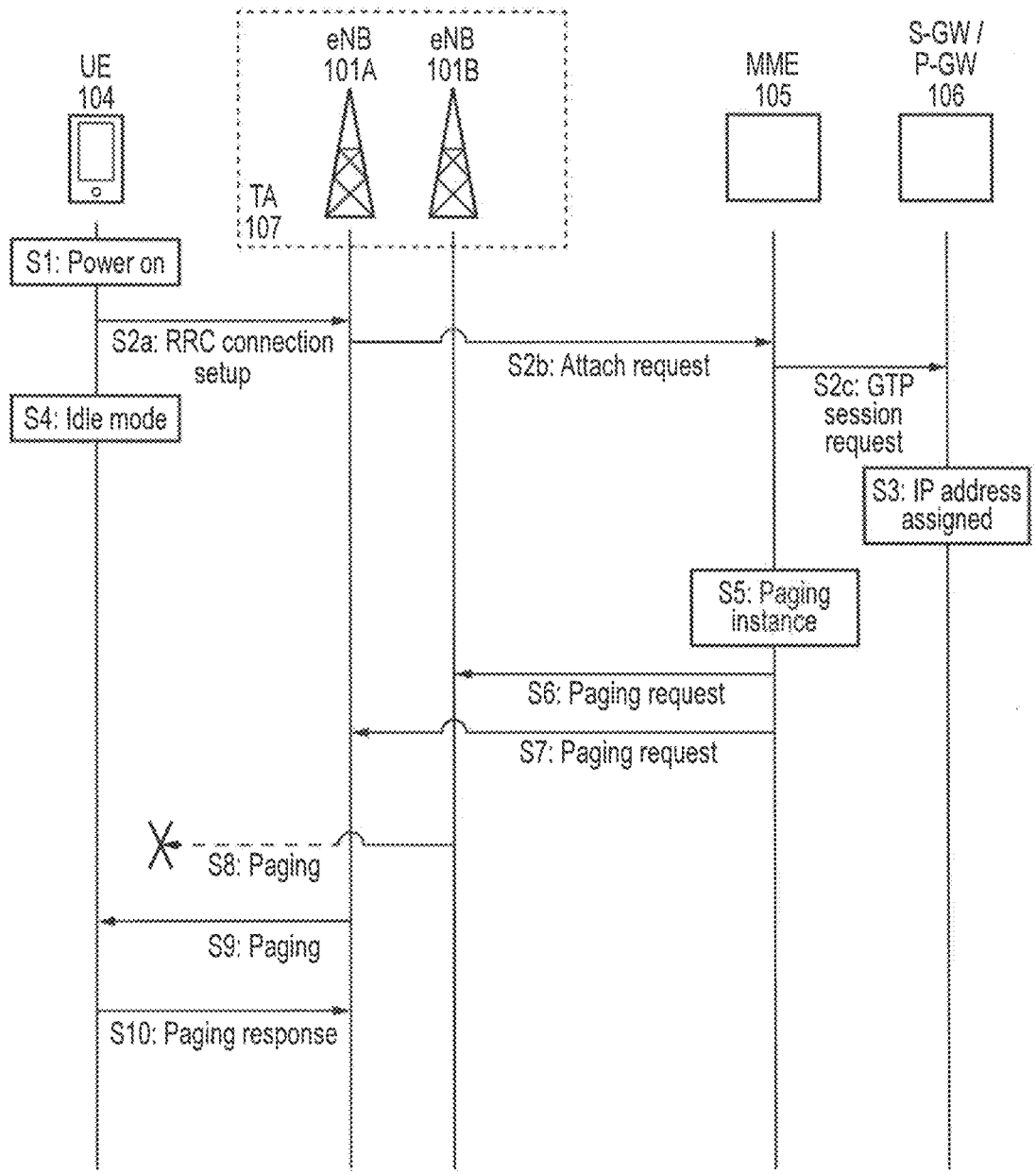
FIG. 3 schematically represents some aspects of a paging procedure in a wireless telecommunications system.

FIG. 3 is a signalling ladder diagram representing some principles of a paging procedure corresponding to step T1 in FIG. 2 for a terminal device 104 in an RRC Idle mode in the LTE-type network schematically represented in FIG. 1. FIG. 3 schematically represents signalling and operating functions associated with the terminal device 104, the base stations 101A, 101B comprising the tracking area 107, and the MME 105 and gateway 106 of the core network 102.

For the sake of this example it is assumed the terminal device 104 initially attaches to the network through base station 101A within the tracking area 107 before entering an idle mode. Furthermore, it is assumed the terminal device 104 has not moved to a different tracking area and so has not provided any tracking area update. Thus, the core network 102 will assume the terminal device is located somewhere within tracking area 107 (i.e. somewhere within the coverage areas of communication cells 103A and 103B which comprise the tracking area 107).

Thus, referring to FIG. 3, in step S1 the terminal device 104 is powered on.

In step S2 (comprising sub-steps S2a, S2b and S2c), and in accordance with conventional techniques, an RRC connection procedure (in this example an initial attach procedure) is initiated by the terminal device with signalling exchanged between the terminal device 104, the base station 101A, the MME 105, and gateway 106 as schematically represented in the figure.

For LTE this signalling comprises RRC connection setup signalling from the terminal device 104 to the base station 101A (step S2a), attach request signalling from the base station 101A to the MME 105 (step S2b), and GPRS tunnel protocol session request signalling (step S2c).

As is well known, the specific base station through which the terminal device initially attaches may be determined from reference signal measurements, and so forth, whereby the terminal device determines which base station is most appropriate (cell selection).

In step S3 the core network assigns an IP address for the terminal device. From this point the core network recognises the existence of the terminal device and keeps track of its location at a tracking area level. Thus, in this particular example, the core network identifies the terminal device as being within tracking area 107 (because the terminal device has accessed the network through base station 101A, which is within tracking area 107).

Although not shown in FIG. 3 in the interests of simplicity, the base station 101A to which the terminal device 104 sends RRC connection setup signalling in step S2 and the terminal device 104 will exchange further signalling to allow the base station 101A to establish capability information for the terminal device 104. For example, the base station 101A will transmit a UE capability enquiry and the terminal device will respond with a UE capability information message.

As schematically represented in step S4, the terminal device having attached to the network and exchanged capability information with the base station, enters RRC idle mode. As is conventional, the base station 101A will discard the UE capability information and other context information associated with the terminal device at this stage.

Thus steps S1 to S4 in FIG. 3 schematically represent the process for a terminal device being switched on and attaching to the network before entering idle mode. This represents the starting point for the processing represented in FIG. 2.

In step S5 the MME 105 recognises that a paging instance has arisen for the terminal device 104. The specific reason for the paging requirement is not significant, and may, for example be because a third party is seeking to place a telephone call to the terminal device 104 or because an application server has data to communicate to the terminal device.

The MME 105 in the core network 102 can recognise the terminal device is located in one of the communication cells 103A and 103B which comprise tracking area 107, but the MME 105 does not know which one. Accordingly, the MME 105 sends a paging request message over the S1-AP interface to each of the base stations associated with the tracking area 107. Thus, in this example the MME 105 sends paging request messages to both base stations 101A and 101B, as schematically represented in steps S6 and S7. The MME 105 does not send a paging request message to the base station 101C serving communication cell 103C because communication cell 103C is not within tracking area 107 in which the terminal device is taken as being located.

The base stations receiving a paging request message from the MME 105, in this case base stations 101A and 101B, are configured to transmit paging signalling to seek to establish contact with the terminal device 104. This is schematically represented in FIG. 3 in steps S8 and S9.

It is assumed for this example the terminal device has remained within the coverage area 103A of base station 101A and so receives the paging signalling transmitted in step S9 by base station 101A, and responds accordingly, as schematically indicated in step S10, for example by initiating a random access procedure to establish an RRC connection to the network. Thus steps S9 and S10 in FIG. 3 correspond with steps T1 and T2 in FIG. 2. The paging signalling sent in step S8 by base station 101B is not received by the terminal device 104 and so is in effect wasted signalling.

Following step S10, the various elements represented in FIG. 3 may continue to exchange signalling in accordance with conventional techniques, for example depending on why the paging instance arose in step S5.

Thus, FIG. 3 schematically represents conventional principles for paging a terminal device in RRC idle mode in a wireless telecommunications system.

Idle mode terminal devices are conventionally configured to seek paging messages periodically. For terminal devices operating in a discontinuous reception (DRX) mode this occurs each time they wake up for their DRX active time. Paging signals for a specific terminal device are transmitted in defined frames (Paging Frames)/sub-frames (Paging Occasions) which are derived from the International Mobile Subscriber Identifier (IMSI) of the terminal device, as well as paging related DRX parameters established in system information transmitted within the network.

In a conventional LTE-based system, a terminal device thus receives and checks the contents of specific sub-frames (paging occasions) in specific frames (paging frames) to look for paging signalling. For example, in accordance with the standards set out in ETSI TS 136 321 V15.2.0 (2018-07)/3GPP TS 36.321 version 15.2.0 Release 15 [8], a Paging Frame (PF) is a downlink radio frame which may contain one or more Paging Occasion(s) (PO), where a Paging Occasion is a sub-frame in which there may be paging signalling. Paging signalling is conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by ETSI TS 136 321 V15.2.0 (2018-07)/3GPP TS 36.321 version 15.2.0 Release 15 [8]). All terminal devices check whether PDCCH at the specific PF/PO includes P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

The paging message represented in step T1 of FIG. 2 and in step S9 of FIG. 3 is an RRC (radio resource control) message. As for other RRC messages, the paging message is ASN.1 (abstract syntax notation) encoded. The following table provides details of the 3GPP Release 15 structure of the paging message in an LTE context.

```
****************************************************************
                                  Paging message
-- ASN1START
Paging ::=              SEQUENCE {
   pagingRecordList              PagingRecordList          OPTIONAL, -- Need ON
   systemInfoModification        ENUMERATED {true}         OPTIONAL, -- Need ON
   etws-Indication               ENUMERATED {true}         OPTIONAL, -- Need ON
   nonCriticalExtension          Paging-v890-IEs           OPTIONAL
}
Paging-v890-IEs ::=     SEQUENCE {
   lateNonCriticalExtension      OCTET STRING              OPTIONAL,
   nonCriticalExtension          Paging-v920-IEs           OPTIONAL
}
Paging-v920-IEs ::=     SEQUENCE {
   cmas-Indication-r9            ENUMERATED {true}         OPTIONAL, -- Need ON
   nonCriticalExtension          Paging-v1130-IEs          OPTIONAL
}
Paging-v1130-IEs ::=    SEQUENCE {
   eab-ParamModification-r11     ENUMERATED {true}         OPTIONAL, -- Need ON
   nonCriticalExtension          Paging-v1310-IEs          OPTIONAL
}
Paging-v1310-IEs ::=    SEQUENCE {
   redistributionIndication-r13       ENUMERATED {true}    OPTIONAL, --Need ON
   systemInfoModification-eDRX-r13    ENUMERATED {true}    OPTIONAL, -- Need ON
   nonCriticalExtension               SEQUENCE { }         OPTIONAL
}
PagingRecordList ::=              SEQUENCE (SIZE (1..maxPageRec)) OF PagingRecord
PagingRecord ::=                  SEQUENCE {
   ue-Identity                    PagingUE-Identity,
   cn-Domain                      ENUMERATED {ps, cs},
   ...
}
PagingUE-Identity ::=             CHOICE {
   s-TMSI                         S-TMSI,
   imsi                           IMSI,
   ...
```

```
}
IMSI ::=            SEQUENCE (SIZE (6..21)) OF IMSI-Digit
IMSI-Digit ::=      INTEGER (0..9)
-- ASN1STOP
```

Paging Field Descriptions cmas-Indication: If present: indication of a CMAS notification.

cn-Domain: Indicates the origin of paging.

eab-ParamModification: If present: indication of an EAB parameters (SIB14) modification.

etws-Indication: If present: indication of an ETWS primary notification and/or ETWS secondary notification.

imsi: The International Mobile Subscriber Identity, a globally unique permanent subscriber identity, see TS 23.003 [27]. The first element contains the first IMSI digit, the second element contains the second IMSI digit and so on.

redistributionIndication: If present: indication to trigger E-UTRAN inter-frequency redistribution procedure as specified in TS 36.304 [4, 5.2.4.10]

systemInfoModification: If present: indication of a BCCH modification other than SIB10, SIB11, SIB12 and SIB14. This indication does not apply to UEs using eDRX cycle longer than the BCCH modification period.

systemInfoModification-eDRX: If present: indication of a BCCH modification other than SIB10, SIB11, SIB12 and SIB14. This indication applies only to UEs using eDRX cycle longer than the BCCH modification period.

ue-Identity: Provides the NAS identity of the UE that is being paged.

Although the above description has summarised existing LTE paging procedures, it is expected that some broadly similar principles may be adopted for future wireless telecommunications systems, and the inventors have recognised there are ways in which these procedures may be modified to provide enhanced functionality, both for existing wireless telecommunication network architectures and wireless telecommunications network architectures based on newer radio access technologies (RATs), such as 5G networks.

Downlink EDT has been proposed in 3GPP Release 15 and a number of implementations have been described, for example in WO2018/029001 [9] and WO2018/114258 [11].

Nonetheless, there are still areas where developments of the proposed schemes for downlink/mobile terminated EDT are needed.

Figure 4:
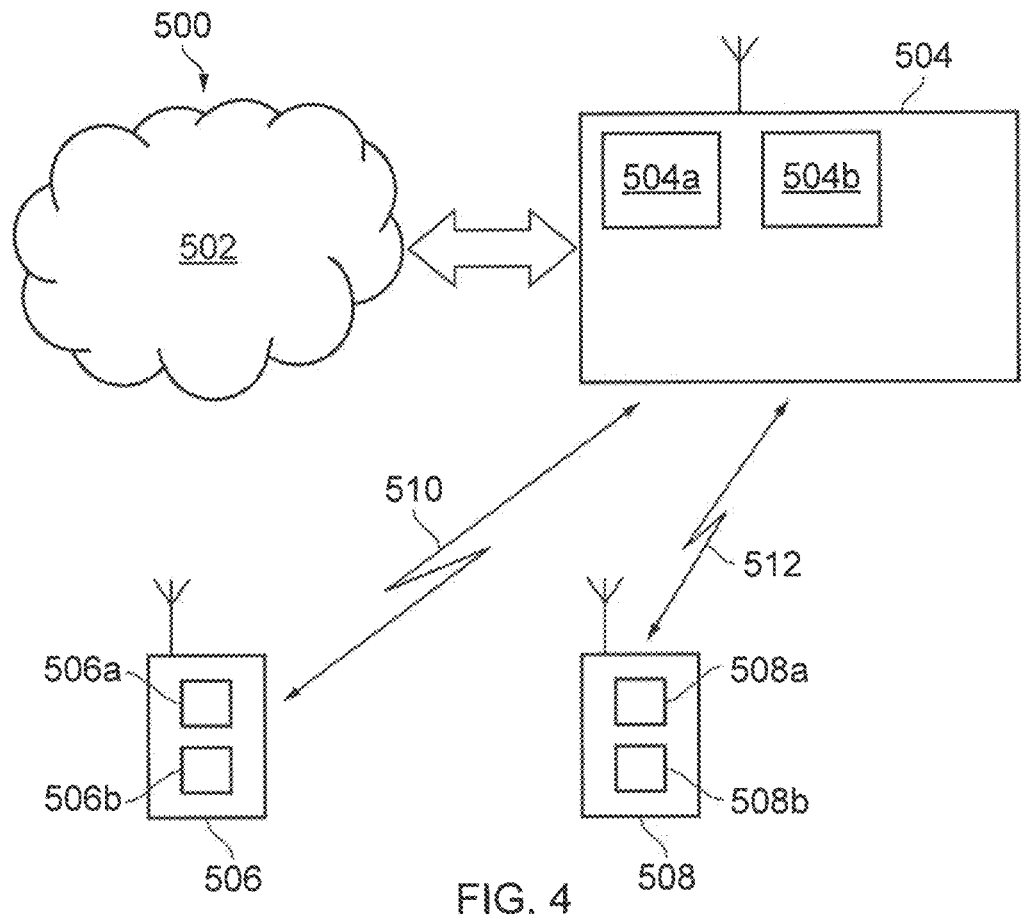
FIG. 4 schematically represents some aspects of a wireless telecommunication system in accordance with an embodiment of the disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 4 in the interests of simplicity.

As with a conventional mobile radio network, the terminal devices 506, 508 are arranged to communicate data to and from the base station (transceiver station) 504. The base station is in turn communicatively connected to a serving gateway, S-GW (not shown), in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and rules function (PCRF) and a packet data network gateway (PDN-GW) which provides a connection from the core network part 502 to an external packet data network, for example the Internet. As noted above, the operation of the various elements of the communications system 500 shown in FIG. 4 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner (i.e. the first terminal device is a legacy terminal device that does not support EDT). It will be appreciated the first terminal device need not be a smartphone-type terminal device and could equally be another type of legacy terminal device, including a device that has the capability to support EDT, but is currently not doing so. The conventional/legacy terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise various sub-units/sub-circuits for providing functionality as explained further herein. These sub-units may be implemented as discrete hardware elements or as appropriately configured functions of the processor circuitry. Thus the processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/ chipset(s). As will be appreciated the legacy (non-EDT) terminal device 506 will in general comprise various other elements associated with its operating functionality.

In this example, it is assumed the second terminal device 508 is a machine-type communication (MTC) terminal device 508 adapted to support mobile terminated/downlink EDT (i.e. the second terminal device may be referred to as an EDT terminal device/UE). In this regard, the second terminal device 508 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices that support EDT but which are not reduced capability terminal devices, but may, for example, comprise smartphone terminal devices, or indeed any other form of terminal device, that may be operating in a wireless telecommunications system. It will be appreciated that an EDT terminal device may also function as a non-EDT/legacy terminal device, e.g. when it does not want to use EDT.

The EDT terminal device 508 comprises transceiver circuitry 508*a* (which may also be referred to as a transceiver/ transceiver unit) for transmission and reception of wireless signals and processor circuitry 508*b* (which may also be referred to as a processor/processor unit) configured to control the terminal device 508. The processor circuitry 508*b* may comprise various sub-units/sub-circuits for providing desired functionality as explained further herein. These sub-units may be implemented as discrete hardware elements or as appropriately configured functions of the processor circuitry. Thus the processor circuitry 508*b* may comprise circuitry which is suitably configured/programmed to provide the desired functionality described herein using conventional programming/configuration techniques for equipment in wireless telecommunications systems. The transceiver circuitry 508*a* and the processor circuitry 508*b* are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 4 in the interests of simplicity.

The base station 504 comprises transceiver circuitry 504*a* (which may also be referred to as a transceiver/transceiver unit) for transmission and reception of wireless signals and processor circuitry 504*b* (which may also be referred to as a processor/processor unit) configured to control the base station 504 to operate in accordance with embodiments of the present disclosure as described herein. The processor circuitry 504*b* may comprise various sub-units/sub-circuits for providing desired functionality as explained further herein. These sub-units may be implemented as discrete hardware elements or as appropriately configured functions of the processor circuitry. Thus the processor circuitry 504*b* may comprise circuitry which is suitably configured/programmed to provide the desired functionality described herein using conventional programming/configuration techniques for equipment in wireless telecommunications systems. The transceiver circuitry 504*a* and the processor circuitry 504*b* are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with both the legacy terminal device 506 and the EDT terminal device 508 according to an embodiment of the disclosure over respective communication links 510, 512. The base station 504 is configured to communicate with the legacy terminal device 506 over the associated radio communication link 510 and with the EDT UE 508 over the associated radio communication link 512 generally following the established principles of LTE-based communications, apart from using modified procedures in accordance with certain embodiments of the present disclosure as described herein.

In accordance with one aspect of certain embodiments of the disclosure, various approaches are proposed for indicating in association with a paging message when downlink EDT is to be transmitted for a terminal device. In accordance with another aspect of certain embodiments of the disclosure, various approaches are proposed for what action a terminal device should take in response to receiving an indication that a downlink EDT is to be transmitted for the terminal device.

First Proposal for Indicating when Downlink EDT is to be Transmitted.

In a first proposal for indicating in association with a paging message when downlink EDT is to be transmitted for a terminal device in accordance with certain embodiments of the disclosure, a base station (eNB) may set a flag, which may be referred to as an EDT data flag, in the paging message which is associated with/linked to an identifier for the terminal device being paged to indicate downlink EDT data is to be transmitted to the terminal device. For example the flag may comprise a single bit and may be set to a first value, e.g. "1"/"true", when the base station has EDT data for transmission to the terminal device, and may be set to a second value, e.g. "0"/"false", when the base station does not have EDT data for transmission to the terminal device, but intends for the terminal device to respond to the paging message in the normal way. Thus, when a terminal device detects its identifier (e.g. IMSI or paging ID) in a paging message (for example after receiving and decoding the paging message in the normal way), the UE proceeds to determine if the EDT data flag associated with an identifier is set. If the EDT data flag is not set, the UE responds to the paging message in the normal way. However, if the EDT data flag is set, the UE prepares itself for receiving/extracting the mobile terminated EDT data (MTD). The terminal device may extract the MTD according to previously proposed techniques for downlink EDT, or in accordance with one of the approaches for this discussed further below.

One specific example implementation of an EDT data flag is to incorporate the flag into the paging message. For example, for a paging message adopting the ASN.1 structure shown in the table above, the "PagingRecord" field, which consists of a list of identities for the terminal devices being paged (typically an IMSI, but other identifiers can also be used, e.g. an S-TMSI), may be modified to include a single bit indicator for each UE identity which infrastructure equipment, such as the base station, can set as the EDT data (MTD) flag. For example, the relevant part of the ASN.1 paging message may be modified to include the new field "edt-Data" providing the EDT data flag for each UE identifier, e.g. as follows:

```
****************************************************************
PagingRecordList ::=    SEQUENCE (SIZE (1..maxPageRec)) OF
                          PagingRecord
PagingRecord ::=        SEQUENCE {
  ue-Identity             PagingUE-Identity,
  cn-Domain               ENUMERATED {ps, cs},
  ...,
[[ edt-Data               ENUMERATED (true) ]]
}
****************************************************************
```

The last field in this extract from a proposed modification to the ASN.1 paging message structure in accordance with certain embodiments of the disclosure introduces the new EDT data flag for indicating whether the base station intends to transmit EDT data to the correspondingly identified terminal devices.

As an alternative implementation to providing the EDT data flag as a bit for each terminal device in the paging record, in another implementation for a paging message adopting the ASN.1 structure, the "PagingRecord" field may remain unchanged, and instead a separate sequence (bit string) of EDT data flags is provided. For example, a terminal device indicated in the third entry in the paging record may be configured to look at the third bit in the sequence of EDT data flags for its own EDT data flag setting. For example, the relevant part of the ASN.1 paging message may be modified to include the new field "mTD-Flag" providing the string of EDT data flags for each UE identifier in the paging record, e.g. as follows:

```
****************************************************************
PagingRecordList ::=    SEQUENCE (SIZE (1..maxPageRec)) OF
                          PagingRecord
PagingRecord ::=        SEQUENCE {
  ue-Identity             PagingUE-Identity,
  cn-Domain               ENUMERATED {ps, cs},
  ...
}
[[mTDFlag ::=           BITSTRING (SIZE (1..maxPageRec)) ]]
****************************************************************
```

The last field in this extract from a proposed modification to the ASN.1 paging message structure in accordance with certain embodiments of the disclosure introduces the new EDT data flag (as mTDFLag sequence) for indicating whether the base station intends to transmit EDT data to the correspondingly identified terminal devices.

It may be noted these EDT-flag based approaches involve a modification to the existing RRC paging message. An RRC Paging message includes the PagingRecord only if a Paged UE is in idle mode with the UE-Identity thus being received from the MME (e.g. in step S7 in FIG. 3). For a Paged UE in connected mode the base station can contact the UE directly (as it is connected to the base station). However, there are proposals for wireless telecommunications systems to adopt a new RRC state, which may be referred to as a suspend/resume RRC state. A terminal device in the suspend/resume RRC state may, like an idle mode terminal device, be said to be not in an active radio resource connected mode (i.e. not in the conventional RRC Connected mode). In that sense the suspend/resume RRC state may also be referred to as an RRC connected mode inactive state. One characteristic that idle mode terminal devices and suspend/resume RRC mode terminal devices share is that they are not in an active RRC Connected mode. In the suspend/resume state the terminal device remains in connected mode so far as the core network is concerned, but is disconnected from the base station, and the base station is responsible for maintaining awareness of the non-RRC connected terminal device within its cell. A UE in this resume/suspend case is in connected state from the core network's point of view and one or more GTP tunnels exist between the base station and S-GW on the core network. Accordingly, when there is new data for DL transmission, the S-GW will forward the data to the base station (instead of asking the MME to page the UE) using a GTP tunnel, and it is then up to the base station to determine how to deliver the data/packet(s). In this case, an RRC Paging message may be used as discussed above, and since the IMSI is not available in the UE context for a suspended UE at the base station, the IMSI as UE-Identity is not used, and instead the S-TMSI or a Resume ID (allocated to the terminal devices by the base station when the terminal device enters the suspended RRC state) may be used in the paging record, along with a corresponding/linked EDT data flag.

In a DoNAS (Data over NAS) case, there is no GTP tunnel between the base station and the S-GW in the core network and the UE's RRC state is idle in the core network. Thus the MME may send the relevant downlink user data to the base station in association with the paging request in step S7 in FIG. 3. In this case the base station may use the IMSI, or other UE identifier, in a manner corresponding to that discussed above.

Second Proposal for Indicating when Downlink EDT is to be Transmitted.

In a second proposal for indicating in association with a paging message when downlink EDT is to be transmitted for a terminal device in accordance with certain embodiments of the disclosure, each EDT capable UE may be associated with a second identifier specifically for indicating it is to receive downlink EDT data, the second identifier for a UE being different to a first identifier for the UE used for normal paging (e.g. a IMSI or S-TMSI). Thus if a base station wishes to conventionally page a UE it can use the first identifier (normal paging identifier) for the terminal device as the paging UE identity PagingRecord of the paging message, and if the base station wishes to transmit downlink EDT data to the terminal device, it can instead use the second identifier (EDT identifier) for the terminal device as the paging UE identity PagingRecord. Thus, when a terminal device detects its first ("normal paging") identifier (e.g. IMSI or S-TMSI) in a paging message (for example after receiving and decoding the paging message in the normal way), the UE responds to the paging message in the normal way. However, if the terminal device detects its second ("EDT") identifier, the UE prepares itself for receiving/extracting the mobile terminated EDT data (MTD). The terminal device may extract the MTD according to previously proposed techniques for downlink EDT, or in accordance with one of the approaches for this discussed further below.

Thus, whereas the first ("normal paging") UE-identities in a PagingRecord consists of IMSI or S-TMSI for UEs being conventionally paged, the additional second ("EDT paging") UE-identities comprises a list of EDT UE IDs (which could have a different length to IMSI/S-TMSI) which are to receive EDT data. The EDT UE IDs could be ASN.1 coded to indicate that they are EDT UE IDs, rather than IMSI/S-TMSI. For example, the relevant part of the ASN.1 paging message may be modified to include the new PagingUE-Identity type "edt-UEId", e.g. as follows:

```
****************************************************************
PagingUE-Identity ::=          CHOICE {
  s-TMSI                         S-TMSI,
  imsi                           IMSI,
  ...,
  edt-UEId                       EDT-UEID
}
****************************************************************
```

The last field in this extract from a proposed modification to the ASN.1 paging message structure in accordance with certain embodiments of the disclosure introduces the new edt-UEId PagingUE-Identity type for use by the base station to indicate EDT data is to be transmitted to the terminal device.

There are various ways a terminal device may be assigned/associated with a second identifier for EDT paging (EDT UE ID) in accordance with different embodiments of the disclosure.

In one approach the terminal device may be configured with an EDT UE ID when it first connects to the network. Thus, when the UE first connects, it will be configured to receive downlink EDT and part of this configuration consists of assigning the UE an EDT UE ID. This EDT UE ID may be unique to the UE (or group of UEs that are to receive EDT data together). After the UE transitions to idle mode after initially connecting to the network (i.e. in a step corresponding to step S4 in FIG. 3), it monitors for paging messages at its paging occasion in the usual way, and if a paging message is received, the UE will proceed to decode the message and check whether it contains the UE's IMSI/S-TMSI (indicating the UE is being conventionally paged) or the UE's EDT UE ID (indicating the UE is being paged to receive EDT data).

Figure 5:
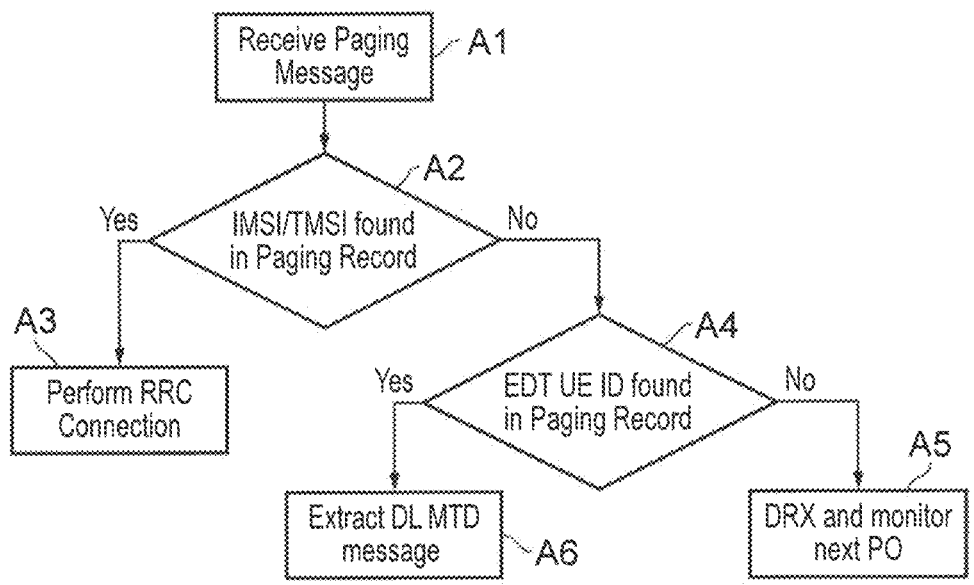
FIG. 5 schematically represents a process for indicating mobile-terminated early data transmission (EDT) in a wireless telecommunication system according to an embodiment of the disclosure.

FIG. 5 is a flow diagram schematically showing an example implementation of an approach for checking paging messages by a terminal device that has been configured with an EDT UE ID, which is stored in the UE context prior to moving to idle mode (e.g. it may be included in an RRC-ConnectionRelease message). When the UE receives a paging message (step A1), it checks for whether the paging record contains its IMSI/S-TMSI (step A2), and if it finds its IMSI/S-TMSI in the paging record in step A2, it will perform an RRC connection as per legacy methods, i.e. it will respond in accordance with a conventional paging request (step A3). If the UE does not detect its IMSI/S-TMSI in the paging record in step A2, the UE will then check whether its EDT UE ID is in the paging record (step A4). If the UE's EDT UE ID is not found in the paging record in step A4, the UE will determine that it is not the paged UE (either conventionally or for EDT data) and will go back to sleep (DRX) until the next paging occasion (step A5). However, if the UE does detect its configured EDT UE ID in the paging record in step A4, the UE will proceed to extract the data message transmitted using downlink EDT via the paging message. The terminal device may extract the data message (MTD) according to previously proposed techniques for downlink EDT, or in accordance with one of the approaches for this discussed further below.

In another approach the terminal device may be configured with an EDT UE ID when transitioning to an RRC suspend state. As noted above, there are proposals for current systems to support, in addition to conventional RRC idle and connected modes, a Suspend and Resume feature whereby a UE stores its UE Context containing parameters such as a resume ID and security keys when it is sent to idle mode. This enables the UE to resume its connection rather than performing a fresh RRC connection when it needs to perform data exchange with the network. This feature reduces higher layer signalling (between UE, eNB and MME). In accordance with certain embodiments of the disclosure the scope of a suspend/resume procedure may be extended to include Paging with DL data (i.e. Mobile Terminated EDT), and an EDT UE ID may be added as a new field in the UE Context as part of a Suspend and Resume configuration. In some example implementations the EDT UE ID for a terminal device may correspond with its Resume ID. That is to say, the base station may include a terminal device's Resume ID in a paging record of a paging message to act as an indicator/flag that the terminal device is to receive EDT data (i.e. an MTD message). In some example implementations the EDT UE ID for a terminal device may correspond with a truncated form of its Resume ID. For example, the ResumeID may be 40 bits and may be truncated to 24 bits (according to a predefined truncating scheme) to provide the EDT UE ID. This would help reduce the size of the paging message carrying this EDT UE ID in cases where this is considered appropriate.

Third Proposal for Indicating when Downlink EDT is to be Transmitted.

In a third proposal for indicating in association with a paging message when downlink EDT is to be transmitted for a terminal device in accordance with certain embodiments of the disclosure, an indicator may be provided in association with so-called wake-up signalling (WUS) provided in advance of a paging occasion to indicate if the paging occasion contains a paging message. Wake up signalling is proposed to help reduce power consumption associated with monitoring for paging massages, for example as described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [11]).

The proposed WUS is expected to be carried on a new physical channel and is intended to allow terminal devices to determine whether or not they need to actually decode PDCCH in an upcoming paging occasion. That is to say, whereas in accordance with previously proposed techniques a terminal device decodes PDCCH during every paging occasion to determine if there is a paging message, and if so decodes PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH).

Thus in LTE Release 16 of the 3GPP specifications it is proposed that a PO (paging occasion) can in effect be enabled or disabled by the presence/absence of a wake-up signal. In accordance with certain embodiments of the present disclosure, a WUS signal may be transmitted in advance of a paging occasion to indicate whether:

EDT is available in the PO

Conventional paging is available in the PO

Both EDT and conventional paging are available in the PO

Neither EDT nor conventional paging are available in the PO

These different indications can, for example, be provided by using different WUS sequences or cover codes for the WUS, by transmitting the WUS in different predefined time/frequency resources associated with each possibility, or by constructing the WUS from two different base sequences (it is noted the 3GPP Release 15 eMTC WUS is constructed from a repetition of an NB-IoT WUS, and the different indications in this example can be formed by using two different NB-IoT sequences to indicate presence of MT EDT and/or paging). In some examples when in the base station both EDT and conventional paging are available, the base station may use one paging occasion in a paging time window for EDT paging and another paging occasion in the paging time window for conventional paging.

Fourth Proposal for Indicating when Downlink EDT is to be Transmitted.

In a fourth proposal for indicating in association with a paging message when downlink EDT is to be transmitted for a terminal device in accordance with certain embodiments of the disclosure, different paging RNTIs may be used for conventional paging and paging for EDT.

Thus in one example, the existence of MTD (EDT) within a paging occasion for a UE is indicated using a new RNTI, i.e. EDT-RNTI, used to decode the MPDCCH that schedules the paging message. As noted above, for conventional paging, the paging message is carried by a PDSCH which is scheduled by a DCI. This DCI is carried by an MPDCCH and the CRC of the DCI is masked with a P-RNTI (e.g. set at FFFE in hexa-decimal for the standard defined by ETSI TS 136 321 V15.2.0 (2018-07)/3GPP TS 36.321 version 15.2.0 Release 15 [8]). Terminal devices decode the DCI addressed to P-RNTI and if their identify is included in the corresponding paging message, they react accordingly. In accordance with certain embodiments of the disclosure a second paging RNTI, EDT-RNTI, is used to mask the DCI for what is, in effect, a second paging message specifically addressed to terminal devices which are to receive EDT data. Thus, terminal devices decode the DCI addressed to EDT-RNTI and if their identify is included in the corresponding paging message, they prepare themselves for receiving a subsequent EDT data transmission. The reception/extraction of the EDT data may be performed in accordance with previously proposed techniques or any of the approaches discussed further below.

Figure 6:
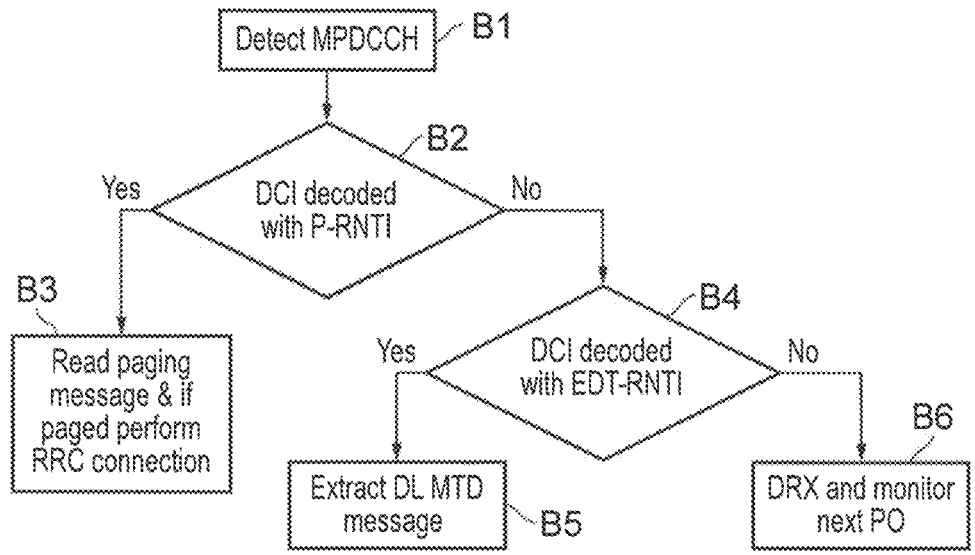
FIG. 6 schematically represents a process for indicating mobile-terminated EDT in a wireless telecommunication system according to an embodiment of the disclosure.

FIG. 6 is a flow diagram schematically showing an example implementation of this approach. On detecting MPDCCH in a Paging Occasion, PO (step B1), the UE first checks if the DCI passes the CRC check using P-RNTI as per legacy system behaviour (step B2), and if it detects a DCI with P-RNTI, the UE will read the paging message to see if it is being paged (step B3). If the UE fails to decode the DCI with P-RNTI in step B2, it will then try to see if the EDT-RNTI passes the CRC check (step B4). If it passes, then the UE proceeds to extract the MTD (EDT) message (step B5), otherwise it will consider that it failed to receive a DCI and move back into DRX where it will monitor the next PO (step B6). The EDT-RNTI may be configured by the network or predefined by standard. The DCI addressed to EDT-RNTI may be a legacy format DCI for paging, i.e. Format 6-2 in ETSI TS 136 212 V15.1.0 (2018-03)/3GPP TS 36.212 version 15.1.0 Release 15 [12] or a new DCI format. If the eNB wishes to page both a legacy UE and an EDT UE in the same paging occasion, it can either: (i) send separate paging messages, one based on P-RNTI and one based on EDT-RNTI; or (ii) default to using P-RNTI only and the legacy procedure so UEs that could have been assigned with MTD-EDT instead receive the data via the legacy procedure.

In one example the EDT-RNTI may be common to a group of UEs or to a cell. This EDT-RNTI can then be broadcast in the SIB or RRC configured when the relevant UEs first connect to the network, for example it may be included in an RRCConnectionRelease message when the respective UEs transition to idle. In this case UEs in the sub-group/cell that are capable of DL EDT via the paging message would be able to decode the DCI scheduling the PDSCH carrying the MTD message. Here the MTD message (which may be transmitted according to one of the approaches discussed further below) may indicate the identity of the UE that the MTD message is intended for. This can be done by:

Including the UE IMSI/TMSI or the EDT UE ID in a field in the MTD message,

Including the UE ID in the MAC (medium access control) header of the message.

The CRC of the PDSCH carrying the MTD message can be masked with a unique ID, e.g. EDT UE ID.

A potential benefit of this example in some implementations is that only a relatively small number of RNTIs is required which would help avoid unduly depleting the available pool of RNTIs. Another potential advantage of this scheme is that the UE can move to another cell and all it needs is to read the SIB of that new cell in order to determine the EDT-RNTI used in that cell in order to support DL EDT. A potential drawback is that another UE ID is needed to identify which UE the MTD is intended for.

In some examples, the EDT-RNTI is predefined by specifications and a fixed EDT-RNTI is used for all the cells.

In some examples, the EDT-RNTI is UE specific. In this case the network configures each DL EDT capable UE with a unique EDT-RNTI which the UE can use in idle mode. A potential benefit of this example in some implementations is that since each EDT-RNTI is unique to a UE, the DCI can contain the DL grant for the MTD message directly. That is the DCI could directly schedule the PDSCH carrying the MTD for the UE, e.g. it can use DCI Format 6-1A and 6-1 B [12]. A potential drawback is that an EDT-RNTI assigned to a terminal device in one cell may not be valid (or may clash with an existing UE EDT-RNTI) when the terminal device moves to a different cell, but the network may not know when an idle mode terminal device has moved at the cell level.

Thus, in an example in which the EDT-RNTI is UE specific, the UE may be configured to indicate to the network when it changes cell. The network could then re-assign the UE EDT-RNTI and inform the MME of the location of the UE. Hence the network would be provided with knowledge of the location of the UE at the cell level. This approach may, for example, be considered appropriate for UEs that are relatively static and so less likely to perform frequent cell updates with associated RRC connection to the eNB as this can help reduce the signalling overhead.

Figure 7:
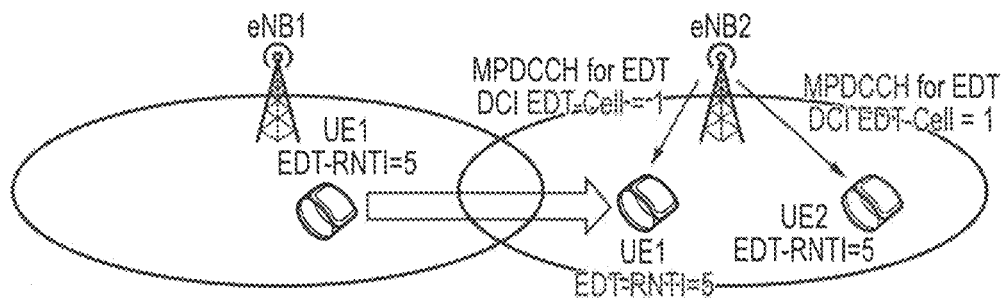
FIG. 7 schematically represents a first UE associated with a first EDT identifier moving from a first communication cell to a second communication cell containing a second UE also associated with the first EDT identifier according to an embodiment of the disclosure.

In another example in which the EDT-RNTI is UE specific, the EDT-RNTI may provide for only partial identification of the MTD's target UE. For example, the DCI that schedules an MTD message could then indicate further identification that would provide sufficient information to identify the UE. One example of this would be for this additional ID in the DCI to indicate the cell that issued the EDT-RNTI, i.e. an EDT-Cell ID. This would allow the UE to move to another cell and still be able to identify whether the MPDCCH detected during a PO is for it or not. An example is schematically shown in FIG. 7, where UE1 is initially configured by eNB1 with EDT-RNTI=5. In eNB2, another UE, i.e. UE2, is also configured with EDT-RNTI=5. UE1 then moves from eNB1 to eNB2 and monitors the PO in eNB2. A DL EDT is transmitted to UE1 and at this point the MME is unaware of the UE location and hence the MPDCCH carrying the DCI that schedules for this DL EDT message is broadcasted in eNB1 and eNB2. Both UE1 and UE2 receive this DCI and decode it since its CRC is masked with the same EDT-RNTI=5. As per this example, the DCI indicates a further ID, i.e. the ID of the cell that configured the EDT-RNTI for the UE to which the DCI is targeted. Since UE2 is configured by eNB2 (with ID=2) UE2 will ignore the DCI message but UE1 identifying that the ID=1, would read the DL grant of this DCI and get the corresponding PDSCH for the MTD message.

Fifth Proposal for Indicating when Downlink EDT is to be Transmitted.

In another approach according to certain embodiments of the disclosure, a new field in the DCI scheduling the PDSCH containing a paging message may be provided to indicate that the paging message itself relates to EDT MTD. The higher layers in the UE can then process the paging message taking account of this additional "side" information about the paging message.

For example, the existing DCI format 6-2 [12] for paging may include a flag to indicate for a UE whether a corresponding PDSCH is a MTD message. The existing DCI format 6-2 contains a Paging/Direct Indication Flag, which tells the UE whether the DCI is a DL grant for a paging message or it is an indication for an SI change (i.e. Direct Indication). The proposed DL EDT flag can be indicated using these existing flags. For example, if the Paging/Direct Indication Flag=1 (i.e. the DCI is a DL Grant for a paging message), the DL EDT flag may be indicated using an unused state, e.g. an unused Resource Assignment, or a combination of Resource Assignment, MCS, Repetition number that are not available for use when performing legacy paging. Thus if the UE determines the DCI indicates an invalid combination of Resource Assignment, MCS and Repetition number, it may conclude the Paging/Direct Indication being set to "1" is in fact an indication there is EDT data for the terminal device. In another example, if the Paging/Direct Indication Flag=0 (i.e. the DCI is an SI change indication), there are unused bits which can be used to indicate that the DCI is for DL EDT. In this case, a DL grant may also be provided using these unused bits, and if remaining bits are available, a further identity to indicate the UE or group of UEs that the DL grant is for (e.g. EDT-Cell ID as per the previous example discussed above with reference to FIG. 7) can be signalled.

The flag in the DCI could thus indicate to the UE it should decode the corresponding paging message differently, i.e. to look for a relevant EDT UE ID or an MTD message.

Sixth Proposal for Indicating when Downlink EDT is to be Transmitted.

In another approach according to certain embodiments of the disclosure, DL EDT might only be available in only some predetermined Paging Occasions. This can help avoid a UE having to look for DL EDT in every PO. In some implementations the predetermined POs might only contain DL EDT. When combined with aspects of the fourth proposal discussed above in relation to using an EDT-RNTI, a DL EDT capable UE need only seek to decode the DCI using EDT-RNTI in the predetermined subset of POs, thereby helping reduce the overall blind decoding task. It will be appreciated that these POs need not contain DL EDT, for example there may not be any DL EDT if there is no MTD from the network.

Figure 8:
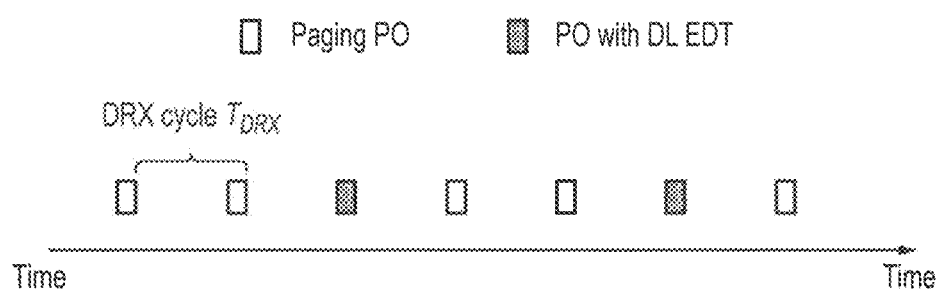
FIG. 8 schematically represents an arrangement, in time, of paging occasions with a predefined subset being available for providing an indication of mobile-terminated (i.e. downlink) EDT in a wireless telecommunication system according to an embodiment of the disclosure.

Thus in one example, the POs where DL EDT is available are a predetermined subset of the UE's conventional POs. The subset of POs available for DL EDT may be configured by the network e.g. it may be broadcast in SIB (system information block signalling), or RRC configured when the UE is connected. Thus each UE may monitor its conventional set of POs based on its normal paging ID (e.g. IMSI/TMSI), and in a subset of the POs, the UE may:

Also look for DL EDT using one or more of the approaches discussed above. A schematic example of this is shown in FIG. 8 in which a UE is configured with a PO that occurs every $T_{DRX}$ ms, i.e. the UE DRX cycle is $T_{DRX}$. In this example, in every 3rd PO (heavy shading as per legend) the UE will monitor for possible DL EDT in addition to a possible (legacy) paging message.

Look only for DL EDT using one or more of the approaches discussed above. Referring again to the example timing in FIG. 8, the UE will look for DL EDT at every 3rd PO (heavy shading).

In the example of FIG. 8 the UE will not look for DL EDT in the light shaded POs, and the network will correspondingly not seek to provide the UE with EDT data in these predetermined POs.

In another embodiment, the predetermined POs where DL EDT is available may be associated with a separate PO cycle, e.g., with a separate DRX cycle from that of the legacy POs for conventional paging. The separate POs for DL EDT may be configured by the network, e.g. via SIB or UE specific RRC signalling.

Having set out some example approaches for indicating to a terminal device that there is MTD data to decode in accordance with certain embodiments of the disclosure, some approaches for transmitting the MTD/DL EDT data itself are now set out in accordance with certain other embodiments of the disclosure.

First Proposal for Transmitting MTD Data

In a first proposal, the Mobile Terminated data sent by DL EDT is in the paging message itself. That is to say, the MTD is attached to the paging message. In one example implementation, locations for the MTD in the paging message for the different UEs may be in the same order as the order of the indications of the UE IDs for EDT indicated in the paging message. For example, the first MTD sent by DL EDT may correspond to the first indicated UE ID in the paging message, and so on. In another example implementation, a UE ID (indicating the UE to which the MTD DL EDT message is addressed) may be contained within the MTD DL EDT message itself (in this example, all UEs that are capable of receiving MTD DL EDT may parse the received MTD DL EDT messages, but a UE will only act on an MTD DL EDT message if it contains an indication of its own UE ID).

In another example, the paging message may contains a maximum of a one MTD message sent by DL EDT. If at any one time instance (e.g. at any one paging occasion), more than one UE needs to be sent MTD, the base station may revert to the use of legacy procedures (e.g. the legacy PRACH procedure and transmission of DL data within an RRC connection) for one or both UEs. This approach can help simplify the signalling structure and procedures associated with a paging message that supports MTD by DL EDT.

It may be noted that there may in some respects be an element of inefficiency in transmitting the MTD in a paging message in some implementations since the paging message is typically sent in multiple cells comprising a tracking area. However, there are various approaches that can help mitigate against this if it is considered a concern for a given implementation. For example, in one approach MTD via paging may only be sent, at least initially, in the cell to which the UE was last attached. If the MTD is not successfully transmitted to the UE in this cell, the UE may then be paged (as per legacy procedures) in the other cells in the tracking area, and the DL data is sent to the UE using legacy procedures. In another approach, when the network is lightly loaded in terms of paging, MTD via paging may be used, and when the paging load is higher, legacy procedures may be used.

Second Proposal for Transmitting MTD Data

In some examples, the Mobile Terminated data sent by DL EDT may be in a separate PDSCH (i.e. separate from the PDSCH carrying the paging message). That is to say, the MTD may be transmitted using a separate PDSCH to that including the paging record. Separating the MTD from the paging message can in some cases help reduce or maintain the size of the paging message (compared to approaches involving appending the MTD to the paging message itself). This can, in some cases, be beneficial for UEs in coverage enhancement since it may require fewer repetitions (noting that the paging message is typically sent at a number of repetitions that is sufficient to reach UEs in the worst coverage conditions). There are several approaches for the Mobile Terminated data to be sent in a separate PDSCH.

Figure 9:
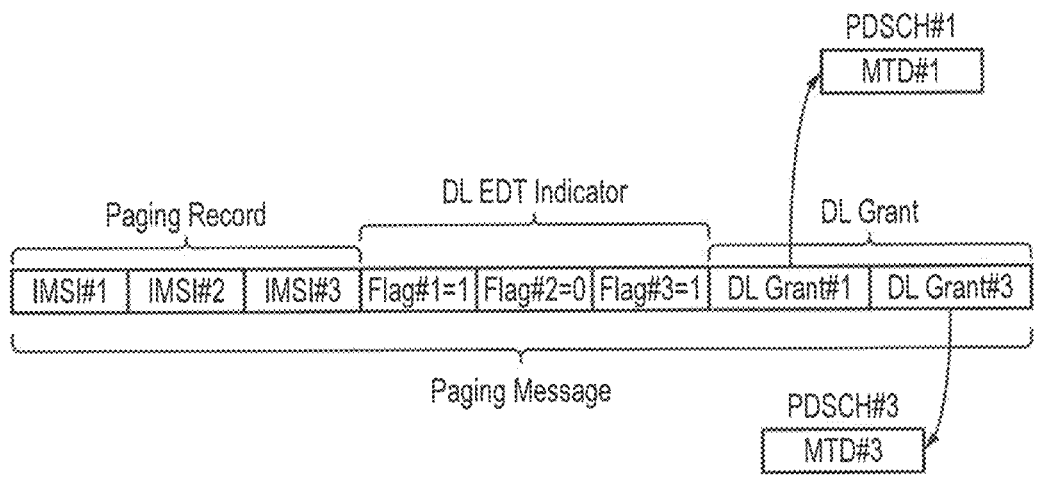
FIGS. 9 to 11 schematically represent approaches for communicating mobile-terminated (i.e. downlink) EDT data in a wireless telecommunication system according to embodiments of the disclosure.

In a first approach a DL resource grant for the MTD PDSCH is explicitly indicated in the paging message. An example of this is schematically represented in FIG. 9 which schematically indicates a logical representation of elements of a paging message according to the above-discussed first proposal for indicating when downlink EDT is to be transmitted in which the paging record is accompanied by a sequence of EDT flags in what is referred to above as an mTDFlag sequence and is referred to in FIG. 9 as a DL EDT indicator. Thus in the example of FIG. 9 the paging record in the paging message includes three UE identifiers, IMSI #1, IMSI #2 and IMSI #3, and three corresponding EDT indicator flags, FLAG #1, FLAG #2 and FLAG #3. In this case the UE identified by IMSI #2 is being conventionally paged (i.e. FLAG #2=0), whereas the UEs identified by IMSI #1 and IMSI #3 are being paged for DL EDT (i.e. FLAG #1=1 and FLAG #3=1). Thus in this example the paging message further includes two explicit indications of resource allocation for the EDT data for the UEs identified by IMSI #1 and IMSI #3 respectively, indicated in FIG. 9 as DL Grant #1 and DL Grant #3. In this example DL Grant #1 identifies PDSCH resources PDSCH #1 for the UE associated with IMSI #1 to receive its MTD data MTD #1 and DL Grant #3 identifies PDSCH resources PDSCH #3 for the UE associated with IMSI #3 to receive its MTD data MTD #3. Each UE that is flagged to receive DL EDT data can determine its resource grant from the ordering of the DL Grant entries. For example, a UE knows its position in the list of UEs referred to in the paging message from the paging record, and can "count" how many preceding UEs are expecting to receive an explicit downlink grant from the values of their EDT indicator flags, and so determine the location of its own DL grant in the sequence of explicit DL grants in the paging message.

Figure 10:
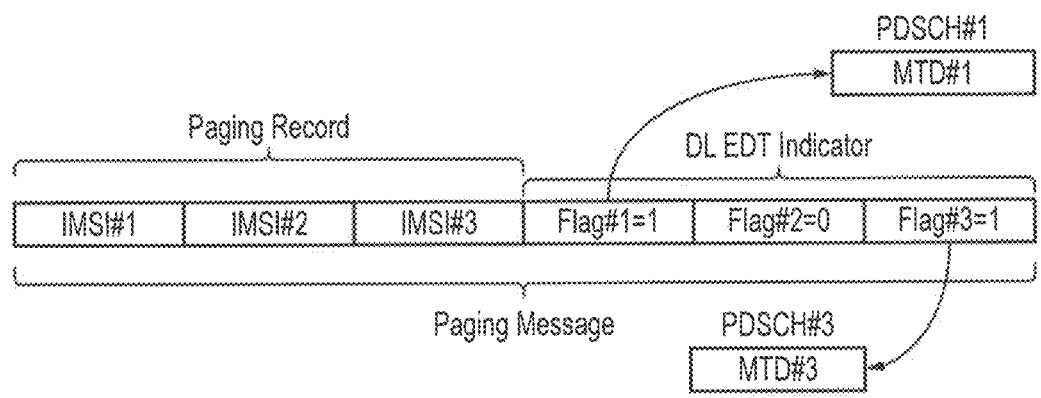

In a second approach a DL resource grant for the MTD PDSCH is implicitly indicated in the paging message. An example of this is schematically represented in FIG. 10 which schematically indicates a logical representation of elements of a paging message according to the above-discussed first proposal for indicating when downlink EDT is to be transmitted in which the paging record is accompanied by a sequence of EDT flags in what is referred to above as an mTDFlag sequence and is referred to in FIG. 10 as a DL EDT indicator. Thus in the example of FIG. 10 (as in FIG. 9) the paging record in the paging message includes three UE identifiers, IMSI #1, IMSI #2 and IMSI #3, and three corresponding EDT indicator flags, FLAG #1, FLAG #2 and FLAG #3. In this case the UE identified by IMSI #2 is being conventionally paged (i.e. FLAG #2=0), whereas the UEs identified by IMSI #1 and IMSI #3 are being paged for DL EDT (i.e. FLAG #1=1 and FLAG #3=1). As schematically represented in FIG. 10, the paging message implicitly identifies PDSCH resources PDSCH #1 for the UE associated with IMSI #1 to receive its MTD data MTD #1 and PDSCH resources PDSCH #3 for the UE associated with IMSI #3 to receive its MTD data MTD #3. There are a number of different ways for providing/deriving the implicit resource allocations. For example, different positions for terminal devices in the paging record list (which might be counted with or without including UEs which are not indicated to receive EDT) may be associated with different predetermined/derivable resource allocations, e.g. on predefined frequency resources and offset in time by a predefined time from the time of the paging message, using a predefined MCS (modulation and coding scheme). The mapping to predetermined resources for the DL EDT grant and identification of the MCS could be defined by an operating standard for the wireless telecommunications system, or network configured, for example in association with the terminal device being configured for EDT operation when it first attaches to the network.

Figure 11:
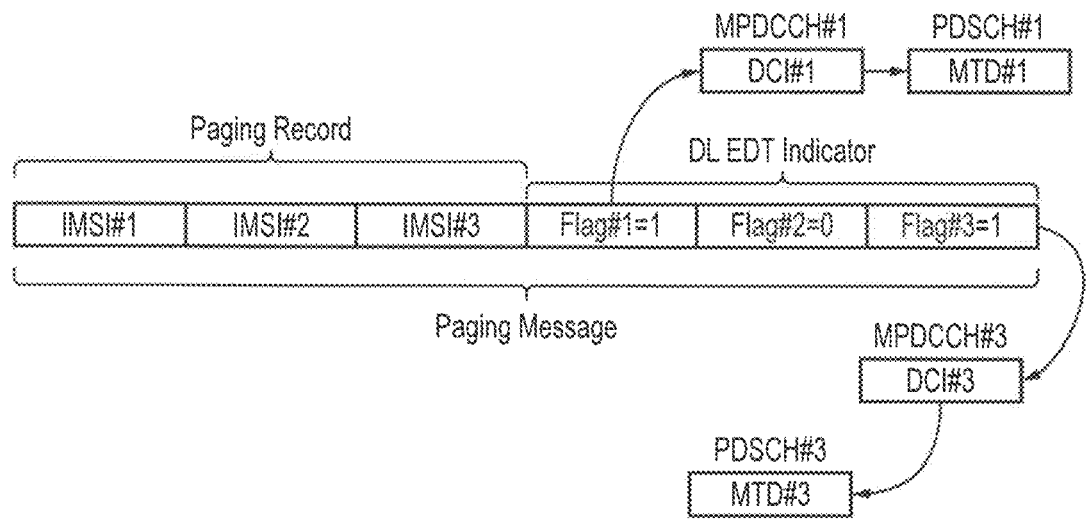

In a third approach a DL resource grant for the MTD PDSCH is scheduled by a DL grant carried by a separate DCI. The PDCCH search space carrying this DCI may, for example, be an existing common search space (e.g. corresponding to that used to schedule RAR and Message 4 in steps T3 and T5 of FIG. 2 respectively), or another configured search space. Alternatively, the location of the PDCCH search space can be implicitly indicated by the location of the UE's identifier in the paging record in a manner corresponding to that discussed above for the implicit indication of the resource grant for MTD. An example of this is schematically represented in FIG. 11 which schematically indicates a logical representation of elements of a paging message according to the above-discussed first proposal for indicating when downlink EDT is to be transmitted in which the paging record is accompanied by a sequence of EDT flags in what is referred to above as an mTDFlag sequence and is referred to in FIG. 11 as a DL EDT indicator. Thus in the example of FIG. 11 (as in FIGS. 9 an 10) the paging record in the paging message includes three UE identifiers, IMSI #1, IMSI #2 and IMSI #3, and three corresponding EDT indicator flags, FLAG #1, FLAG #2 and FLAG #3. In this case the UE identified by IMSI #2 is being conventionally paged (i.e. FLAG #2=0), whereas the UEs identified by IMSI #1 and IMSI #3 are being paged for DL EDT (i.e. FLAG #1=1 and FLAG #3=1). As schematically represented in FIG. 11, the paging message implicitly identifies MPDCCH resources MPDCCH #1 for the UE associated with IMSI #1 to receive DCI #1 indicating PDSCH resources PDSCH #1 for its MTD data MTD #1, and implicitly identifies MPDCCH resources MPDCCH #3 for the UE associated with IMSI #3 to receive DCI #3 indicating PDSCH resources PDSCH #3 for its MTD data MTD #3. There are a number of different ways for providing/deriving the implicit pointers to where to receive the DCI scheduling the MTD data. For example, by using a predetermined search space for where the PDCCH carrying the relevant DCI can be found (via blind decoding).

Having set out some example approaches for indicating to a terminal device that there is MTD data to decode and for communicating MTD data in accordance with certain embodiments of the disclosure, some approaches for how a terminal device might react to receiving MTD data in different circumstances are now set out in accordance with certain other embodiments of the disclosure.

In one example, a UE having received MTD data in accordance with the principles discussed herein may be configured not to continue/complete the RACH and RRC connection procedure upon receiving the MTD message. The configuration of this may be dependent on an indication received from the base station, e.g. in SIB, to inform the terminal device that a RACH is not required when it receives MTD data.

In another example, when a UE receives an MTD message via the paging message (or more generally at the paging stage) as discussed herein, the network may also indicate to the UE that it should also continue to perform an RRC connection. One example approach for implementing this will be for the paging message to include both an IMSI (or S-TMSI) for the terminal device and its EDT UE ID in the paging message. In this scenario the UE may have been configured to search for both IDs, and if both IDs are detected, the terminal device may continue to perform RRC connection after receiving an MTD message.

In another example, in addition to receiving the downlink MTD message during the paging stage, the terminal device may also be requested by the network to transmit uplink EDT data in association with Message 3, for example in accordance with previously proposed techniques for uplink EDT.

Figure 12:
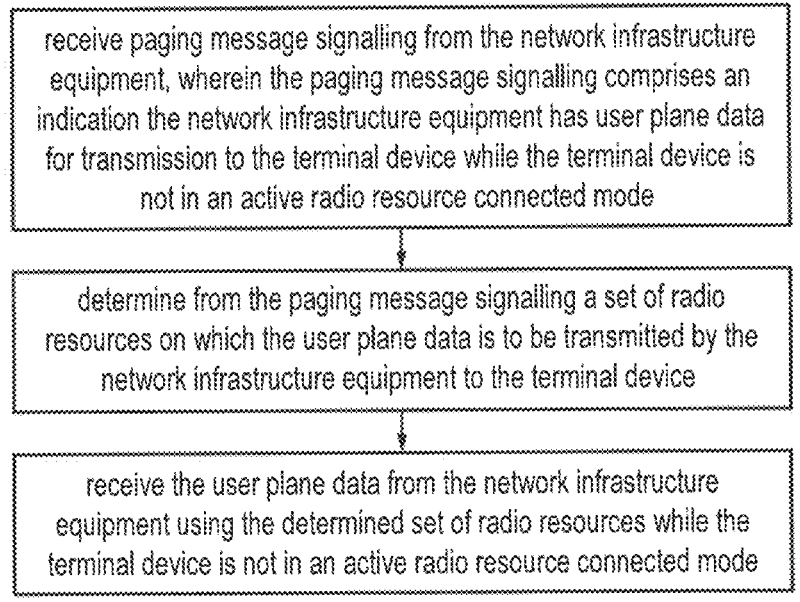
FIG. 12 is a flow chart schematically representing some operating aspects of a terminal device (UE) in accordance with certain embodiments of the disclosure.

FIG. 12 is a flow diagram schematically representing a method of operating a terminal device for receiving user plane data from a network infrastructure equipment in a wireless telecommunications network when the terminal device is not in an active radio resource connected mode. In the first step of the process represented in FIG. 12 the terminal device receives paging message signalling from the network infrastructure equipment, wherein the paging message signalling comprises an indication the network infrastructure equipment has user plane data for transmission to the terminal device while the terminal device is not in an active radio resource connected mode. In the second step of the process represented in FIG. 12 the terminal device determines from the paging message signalling a set of radio resources on which the user plane data is to be transmitted by the network infrastructure equipment to the terminal device. In the third step of the process represented in FIG. 12 the terminal device receives the user plane data from the network infrastructure equipment using the determined set of radio resources while the terminal device is not in an active radio resource connected mode.

Figure 13:
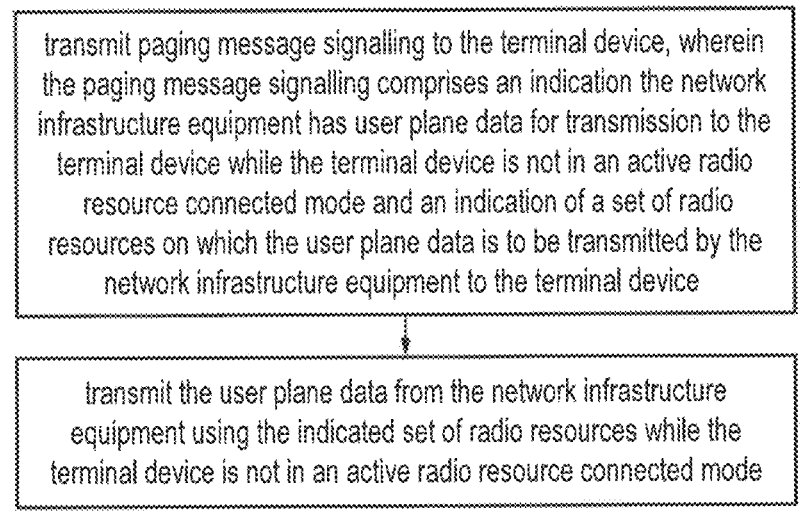
FIG. 13 is a flow chart schematically representing some operating aspects of a base station (network infrastructure equipment) in accordance with certain embodiments of the disclosure.

FIG. 13 is a flow diagram schematically representing a method of operating network infrastructure equipment for transmitting user plane data to a terminal device in a wireless telecommunications network when the terminal device is not in an active radio resource connected mode. In the first step of the process represented in FIG. 13 the network infrastructure equipment transmits paging message signalling to the terminal device, wherein the paging message signalling comprises an indication the network infrastructure equipment has user plane data for transmission to the terminal device while the terminal device is not in an active radio resource connected mode and an indication of a set of radio resources on which the user plane data is to be transmitted by the network infrastructure equipment to the terminal device. In the second step of the process represented in FIG. 13 the network infrastructure equipment transmits the user plane data from the network infrastructure equipment using the indicated set of radio resources while the terminal device is not in an active radio resource connected mode.

Thus there has been described a method of operating a terminal device to receive user plane data from a network infrastructure equipment in a wireless telecommunications network when the terminal device is not in an active radio resource connected mode, the method comprising: receiving paging message signalling from the network infrastructure equipment, wherein the paging message signalling comprises an indication the network infrastructure equipment has user plane data for transmission to the terminal device while the terminal device is not in an active radio resource connected mode; determining from the paging message signalling a set of radio resources on which the user plane data is to be transmitted by the network infrastructure equipment to the terminal device; and receiving the user plane data from the network infrastructure equipment using the determined set of radio resources while the terminal device is not in an active radio resource connected mode.

In some implementations the paging signalling may comprise an indication the network infrastructure equipment has user plane data for transmission to the terminal device while the terminal device is not in an active radio resource connected mode, but the UE might not determine from the paging signalling a set of radio resources on which the user plane data is to be transmitted by the network infrastructure equipment to the terminal device. In other implementations, the paging signalling might not comprise an indication the network infrastructure equipment has user plane data for transmission to the terminal device while the terminal device is not in an active radio resource connected mode, but the UE might determine from the paging signalling a set of radio resources on which user plane data is to be transmitted by the network infrastructure equipment to the terminal device.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It will also be appreciated that while the above-described embodiments have in some respects focused on various steps being performed from the perspective of the terminal device, for example receiving various indications and data, it will be appreciated for each of the approaches described herein the terminal device and the network (e.g. base station or other network infrastructure equipment) each perform directly corresponding steps. For example when the terminal device is said to receive data from the base station, this should also be interpreted as the base station transmitting the data to the terminal device. As another example, it will be appreciated that references to the terminal device locating certain signalling on certain predefined resources corresponds with the base station transmitting the signalling on the predefined resources.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type of terminal device operating with a wireless link to the communication network.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device for receiving user plane data from a network infrastructure equipment in a wireless telecommunications network when the terminal device is not in an active radio resource connected mode, the method comprising: receiving paging signalling from the network infrastructure equipment, wherein the paging signalling comprises an indication the network infrastructure equipment has user plane data for transmission to the terminal device while the terminal device is not in an active radio resource connected mode; determining from the paging signalling a set of radio resources on which the user plane data is to be transmitted by the network infrastructure equipment to the terminal device; and receiving the user plane data from the network infrastructure equipment using the determined set of radio resources while the terminal device is not in an active radio resource connected mode.

Paragraph 2. The method of paragraph 1, wherein the paging signalling comprises a paging message, and wherein the paging message comprises an identifier for the terminal device and the indication the network infrastructure equipment has user plane data for transmission to the terminal device, wherein the indication the network infrastructure equipment has user plane data for transmission to the terminal device comprises a setting for a flag associated with the identifier for the terminal device.

Paragraph 3. The method of paragraph 1 or 2, wherein the terminal device is associated with a first identifier and a second identifier, wherein the first identifier is used by the network to page the terminal device to cause the terminal device to transition to an active radio resource connected mode, and wherein the paging signalling comprises an indication of the second identifier for the terminal device to provide the indication the network infrastructure equipment has user plane data for transmission to the terminal device while the terminal device is not in an active radio resource connected mode.

Paragraph 4. The method of paragraph 3, wherein at least one of the first identifier and the second identifier are specific to the terminal device.

Paragraph 5. The method of paragraph 3 or 4, wherein the first identifier is a first paging radio network temporary identifier common to a plurality of terminal devices in the wireless telecommunications network and the second identifier is a second paging radio network temporary identifier for the terminal device.

Paragraph 6. The method of paragraph 5, wherein the second paging radio network temporary identifier for the terminal device comprises a first part assigned to the terminal device by a network infrastructure equipment and a second part that identifies the network infrastructure equipment that assigned the first part to the terminal device.

Paragraph 7. The method of any of paragraphs 3 to 6, wherein the paging signalling comprises a paging message, and wherein the indication of the second identifier is provided in a paging record of the paging message.

Paragraph 8. The method of any of paragraphs 3 to 7, wherein the paging signalling comprises downlink control signalling for allocating transmission resources for a paging message, and wherein the indication of the second identifier is provided in the downlink control signalling.

Paragraph 9. The method of any of paragraphs 3 to 8, wherein the second identifier is assigned to the terminal device in radio resource control signalling.

Paragraph 10. The method of any of paragraphs 1 to 9, wherein the paging signalling comprises downlink control signalling for allocating transmission resources for a paging message, wherein the downlink control signalling is associated with a first format and a second format, wherein the first format is used by the network to page the terminal device to cause the terminal device to transition to an active radio resource connected mode, and wherein the downlink control signalling comprises the second format to provide the indication the network infrastructure equipment has user plane data for transmission to the terminal device while the terminal device is not in an active radio resource connected mode.

Paragraph 11. The method of any of paragraphs 1 to 10, wherein the paging signalling comprises wake up signalling and a paging message, wherein the wake up signalling is received by the terminal device in advance of a scheduled time for the paging message, and wherein the indication the network infrastructure equipment has user plane data for transmission to the terminal device is provided by a selectable characteristic of the wake up signalling meeting a predefined criterion for indicating the network infrastructure equipment has user plane data for transmission to the terminal device.

Paragraph 12. The method of paragraph 11, wherein the selectable characteristic of the wake up signalling comprises one or more of: a selected signalling sequence for the wake up signalling; a selected grouping of two or more signalling sequences for the wake up signalling; selected time resources for the wake up signalling; and selected frequency resources for the wake up signalling.

Paragraph 13. The method of any of paragraphs 1 to 12, wherein the paging signalling comprises a paging message transmitted by the network infrastructure equipment in a selected one of a plurality of potential paging occasions, and wherein the indication the network infrastructure equipment has user plane data for transmission to the terminal device is provided by the paging message being transmitted in one of a predefined subset of the potential paging occasions.

Paragraph 14. The method of paragraph 13, wherein the predefined subset of the potential paging occasions does not overlap with potential paging occasions for paging the terminal device to cause the terminal device to transition to an active radio resource connected mode.

Paragraph 15. The method of any of paragraphs 1 to 14, wherein the paging signalling comprises a paging message and the user plane data is received from the network infrastructure equipment on radio resources comprising the paging message.

Paragraph 16. The method of any of paragraphs 1 to 15, wherein the paging signalling comprises an explicit indication of the set of radio resources on which the user plane data is to be transmitted by the network infrastructure equipment.

Paragraph 17. The method of any of paragraphs 1 to 15, wherein the paging signalling comprises an implicit indication of the set of radio resources on which the user plane data is to be transmitted by the network infrastructure equipment.

Paragraph 18. The method of paragraph 17, wherein the paging signalling comprises a paging message and the terminal device derives the set of radio resources on which the user plane data is to be transmitted by the network infrastructure equipment based on the position of the terminal device in a list of terminal devices identified in the paging message.

Paragraph 19. The method of paragraph 17 or 18, wherein the terminal device receives the user plane data from the network infrastructure equipment using the determined set of radio resources in accordance with a predefined coding scheme.

Paragraph 20. The method of any of paragraphs 1 to 19, wherein the paging signalling comprises an indication of radio resources for downlink control information to be transmitted by the network infrastructure equipment, and wherein the downlink control information provides an indication of the set of radio resources on which the user plane data is to be transmitted by the network infrastructure equipment.

Paragraph 21. The method of any of paragraphs 1 to 20, further comprising the terminal device determining it should terminate a random access procedure after receiving the user plane data from the network infrastructure equipment.

Paragraph 22. The method of any of paragraphs 1 to 20, further comprising the terminal device determining it should complete a random access procedure to move to an active radio resource connected mode after receiving the user plane data from the network infrastructure equipment using the determined set of radio resources.

Paragraph 23. The method of any of paragraphs 1 to 22, further comprising the terminal device transmitting uplink user plane data to the network infrastructure equipment while the terminal device is not in an active radio resource connected mode.

Paragraph 24. A terminal device for receiving user plane data from a network infrastructure equipment in a wireless telecommunications network when the terminal device is not in an active radio resource connected mode, wherein the terminal device comprises controller circuitry and transceiver circuitry configured such that the terminal device is operable to: receive paging signalling from the network infrastructure equipment, wherein the paging signalling comprises an indication the network infrastructure equipment has user plane data for transmission to the terminal device while the terminal device is not in an active radio resource connected mode; determine from the paging signalling a set of radio resources on which the user plane data is to be transmitted by the network infrastructure equipment to the terminal device; and receive the user plane data from the network infrastructure equipment using the determined set of radio resources while the terminal device is not in an active radio resource connected mode.

Paragraph 25. Integrated circuitry for a terminal device for receiving user plane data from a network infrastructure equipment in a wireless telecommunications network when the terminal device is not in an active radio resource connected mode, wherein the integrated circuitry comprises controller circuitry and transceiver circuitry configured to operate together such that the terminal device is operable to: receive paging signalling from the network infrastructure equipment, wherein the paging signalling comprises an indication the network infrastructure equipment has user plane data for transmission to the terminal device while the terminal device is not in an active radio resource connected mode; determine from the paging signalling a set of radio resources on which the user plane data is to be transmitted by the network infrastructure equipment to the terminal device; and receive the user plane data from the network infrastructure equipment using the determined set of radio resources while the terminal device is not in an active radio resource connected mode.

Paragraph 26. A method of operating network infrastructure equipment for transmitting user plane data to a terminal device in a wireless telecommunications network when the terminal device is not in an active radio resource connected mode, the method comprising: transmitting paging signalling to the terminal device, wherein the paging signalling comprises an indication the network infrastructure equipment has user plane data for transmission to the terminal device while the terminal device is not in an active radio resource connected mode and an indication of a set of radio resources on which the user plane data is to be transmitted by the network infrastructure equipment to the terminal device; and transmitting the user plane data from the network infrastructure equipment using the indicated set of radio resources while the terminal device is not in an active radio resource connected mode.

Paragraph 27. The method of paragraph 26, further comprising the network infrastructure equipment determining the user plane data is to be transmitted to the terminal device while the terminal device is not in an active radio resource connected mode based on the network infrastructure equipment determining it does not need to transmit user plane data to any other terminal devices while they are not in an active radio resource connected mode at the same time as transmitting the user plane data to the terminal device while it is not in an active radio resource connected mode.

Paragraph 28. Network infrastructure equipment for transmitting user plane data to a terminal device in a wireless telecommunications network when the terminal device is not in an active radio resource connected mode, wherein the network infrastructure equipment comprises controller circuitry and transceiver circuitry configured such that the network infrastructure equipment is operable to: transmit paging signalling to the terminal device, wherein the paging signalling comprises an indication the network infrastructure equipment has user plane data for transmission to the terminal device while the terminal device is not in an active radio resource connected mode and an indication of a set of radio resources on which the user plane data is to be transmitted by the network infrastructure equipment to the terminal device; and transmit the user plane data from the network infrastructure equipment using the indicated set of radio resources while the terminal device is not in an active radio resource connected mode.

Paragraph 29. Integrated circuitry for network infrastructure equipment for, transmitting user plane data to a terminal device in a wireless telecommunications network when the terminal device is not in an active radio resource connected mode, wherein the integrated circuitry comprises controller circuitry and transceiver circuitry configured to operate together such that the network infrastructure equipment is operable to: transmit paging signalling to the terminal device, wherein the paging signalling comprises an indication the network infrastructure equipment has user plane data for transmission to the terminal device while the terminal device is not in an active radio resource connected mode and an indication of a set of radio resources on which the user plane data is to be transmitted by the network infrastructure equipment to the terminal device; and transmit the user plane data from the network infrastructure equipment using the indicated set of radio resources while the terminal device is not in an active radio resource connected mode.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75,Dubrovnik, Croatia, Mar. 6-9, 2017
[5] RP-181450, "New WID on Rel-16 MTC enhancements for LTE," Ericsson, 3GPP TSG RAN Meeting #80, La Jolla, USA, Jun. 11-14, 2018
[6] RP-181451, "New WID on Rel-16 enhancements for NB-IoT," Ericsson, Huawei, 3GPP TSG RAN Meeting #80, La Jolla, USA, Jun. 11-14, 2018
[7] Holma H. and Toskala A, "LTE for UMTS OFDMA and SC-FDMA based radio access", John Wiley and Sons, 2009
[8] ETSI TS 136 321 V15.2.0 (2018-07)/3GPP TS 36.321 version 15.2.0 Release 15
[9] WO2018/029001
[10] WO2018/114258
[11] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.
[12] ETSI TS 136 212 V15.1.0 (2018-03)/3GPP TS 36.212 version 15.2.0 Release 15

The invention claimed is:

1. Network infrastructure equipment for transmitting user plane data to a terminal device in a wireless telecommunications network when the terminal device is not in an active radio resource connected mode, wherein the network infrastructure equipment comprises controller circuitry and transceiver circuitry configured such that the network infrastructure equipment is configured to:
    transmit paging signalling to the terminal device, wherein
        the paging signalling comprises an indication the network infrastructure equipment has user plane data for transmission to the terminal device while the terminal device is not in an active radio resource connected mode,
        the paging signalling comprises a paging message comprising an identifier for the terminal device, and
        the indication the network infrastructure equipment has user plane data for transmission to the terminal device comprises a setting for a flag associated with the identifier for the terminal device.
2. The network infrastructure equipment of claim 1, wherein
    the terminal device is associated with a first identifier and a second identifier,
    the first identifier is used by the network to page the terminal device to cause the terminal device to transition to an active radio resource connected mode, and
    the paging signalling comprises an indication of the second identifier for the terminal device to provide the indication the network infrastructure equipment has user plane data for transmission to the terminal device while the terminal device is not in an active radio resource connected mode.
3. The network infrastructure equipment of claim 2, wherein
    at least one of the first identifier and the second identifier are specific to the terminal device.
4. The network infrastructure equipment of claim 2, wherein
    the first identifier is a first paging radio network temporary identifier common to a plurality of terminal devices in the wireless telecommunications network and the second identifier is a second paging radio network temporary identifier for the terminal device.
5. The network infrastructure equipment of claim 4, wherein
    the second paging radio network temporary identifier for the terminal device comprises a first part assigned to the terminal device by a network infrastructure equipment and a second part that identifies the network infrastructure equipment that assigned the first part to the terminal device.

6. The network infrastructure equipment of claim 2, wherein
the paging signalling comprises a paging message, and
the indication of the second identifier is provided in a paging record of the paging message.

7. The network infrastructure equipment of claim 2, wherein
the paging signalling comprises downlink control signalling for allocating transmission resources for a paging message, and
the indication of the second identifier is provided in the downlink control signalling.

8. The network infrastructure equipment of claim 2, wherein
the second identifier is assigned to the terminal device in radio resource control signalling.

9. The network infrastructure equipment of claim 1, wherein
the paging signalling comprises downlink control signalling for allocating transmission resources for a paging message,
the downlink control signalling is associated with a first format and a second format,
the first format is used by the network to page the terminal device to cause the terminal device to transition to an active radio resource connected mode, and
the downlink control signalling comprises the second format to provide the indication the network infrastructure equipment has user plane data for transmission to the terminal device while the terminal device is not in an active radio resource connected mode.

10. The network infrastructure equipment of claim 1, wherein
the paging signalling comprises wake up signalling and a paging message,
the wake up signalling is transmitted to the terminal device in advance of a scheduled time for the paging message, and
the indication the network infrastructure equipment has user plane data for transmission to the terminal device is provided by a selectable characteristic of the wake up signalling meeting a predefined criterion for indicating the network infrastructure equipment has user plane data for transmission to the terminal device.

11. The network infrastructure equipment of claim 10, wherein the selectable characteristic of the wake up signalling comprises one or more of:
a selected signalling sequence for the wake up signalling;
a selected grouping of two or more signalling sequences for the wake up signalling;
selected time resources for the wake up signalling; and
selected frequency resources for the wake up signalling.

12. The network infrastructure equipment of claim 1, wherein
the paging signalling comprises a paging message transmitted by the network infrastructure equipment in a selected one of a plurality of potential paging occasions, and
the indication the network infrastructure equipment has user plane data for transmission to the terminal device is provided by the paging message being transmitted in one of a predefined subset of the potential paging occasions.

13. The network infrastructure equipment of claim 12, wherein
the predefined subset of the potential paging occasions does not overlap with potential paging occasions for paging the terminal device to cause the terminal device to transition to an active radio resource connected mode.

14. The network infrastructure equipment of claim 1, wherein
the paging signalling comprises a paging message and the user plane data is received from the network infrastructure equipment on radio resources comprising the paging message.

15. The network infrastructure equipment of claim 1, wherein
the paging signalling comprises an explicit indication of the set of radio resources on which the user plane data is to be transmitted by the network infrastructure equipment.

16. The network infrastructure equipment of claim 1, wherein
the paging signalling comprises an implicit indication of the set of radio resources on which the user plane data is to be transmitted by the network infrastructure equipment.

17. Integrated circuitry for network infrastructure equipment for, transmitting user plane data to a terminal device in a wireless telecommunications network when the terminal device is not in an active radio resource connected mode, wherein the integrated circuitry comprises controller circuitry and transceiver circuitry configured to operate together such that the network infrastructure equipment is operable to:
transmit paging signalling to the terminal device, wherein
the paging signalling comprises an indication the network infrastructure equipment has user plane data for transmission to the terminal device while the terminal device is not in an active radio resource connected mode,
the paging signalling comprises a paging message comprising an identifier for the terminal device, and
the indication the network infrastructure equipment has user plane data for transmission to the terminal device comprises setting a flag associated with the identifier for the terminal device.

18. A method of operating network infrastructure equipment for transmitting user plane data to a terminal device in a wireless telecommunications network when the terminal device is not in an active radio resource connected mode, the method comprising:
transmitting paging signalling to the terminal device, wherein
the paging signalling comprises an indication the network infrastructure equipment has user plane data for transmission to the terminal device while the terminal device is not in an active radio resource connected mode,
the paging signalling comprising a paging message including an identifier for the terminal device, and
the indication the network infrastructure equipment has user plane data for transmission to the terminal device comprises setting a flag associated with the identifier for the terminal device.

* * * * *